(12) United States Patent
Zhang et al.

(10) Patent No.: US 8,660,901 B2
(45) Date of Patent: Feb. 25, 2014

(54) MATCHING OF ADVERTISING SOURCES AND KEYWORD SETS IN ONLINE COMMERCE PLATFORMS

(75) Inventors: Tao Zhang, Hangzhou (CN); Jiaqing Guo, Hangzhou (CN); Ning Guo, Hangzhou (CN)

(73) Assignee: Alibaba Group Holding Limited (KY)

( * ) Notice: Subject to any disclaimer, the term of this patent is extended or adjusted under 35 U.S.C. 154(b) by 453 days.

(21) Appl. No.: 12/930,649

(22) Filed: Jan. 11, 2011

(65) Prior Publication Data

US 2011/0218852 A1    Sep. 8, 2011

(30) Foreign Application Priority Data

Jan. 13, 2010 (CN) .......................... 2010 1 0003928

(51) Int. Cl.
*G06Q 30/00* (2012.01)
(52) U.S. Cl.
USPC ...................................................... 705/14.73
(58) Field of Classification Search
USPC ...................................................... 705/10, 14
See application file for complete search history.

(56) References Cited

U.S. PATENT DOCUMENTS

| | | | |
|---|---|---|---|
| 2004/0044571 A1* | 3/2004 | Bronnimann et al. | 705/14 |
| 2005/0033771 A1 | 2/2005 | Schmitter et al. | |
| 2006/0206479 A1* | 9/2006 | Mason | 707/5 |
| 2007/0100708 A1 | 5/2007 | Smith et al. | |
| 2008/0040221 A1* | 2/2008 | Wiseman et al. | 705/14 |
| 2008/0052152 A1 | 2/2008 | Yufik | |
| 2008/0103892 A1 | 5/2008 | Chatwin et al. | |
| 2008/0167924 A1 | 7/2008 | Veach | |
| 2008/0201324 A1* | 8/2008 | Aronowich et al. | 707/5 |
| 2008/0249842 A1 | 10/2008 | Lee et al. | |
| 2008/0288328 A1* | 11/2008 | Minor et al. | 705/10 |
| 2009/0006207 A1 | 1/2009 | Datar et al. | |
| 2009/0132336 A1* | 5/2009 | Demir et al. | 705/10 |
| 2009/0234848 A1 | 9/2009 | Leff et al. | |
| 2009/0254397 A1* | 10/2009 | Mahdian et al. | 705/8 |
| 2009/0299998 A1* | 12/2009 | Kim | 707/5 |
| 2011/0035276 A1* | 2/2011 | Ghosh et al. | 705/14.46 |

* cited by examiner

*Primary Examiner* — John G Weiss
*Assistant Examiner* — Christopher Stroud
(74) *Attorney, Agent, or Firm* — Van Pelt, Yi & James LLP

(57) ABSTRACT

Providing online advertisements includes selecting, among a plurality of advertising sources provided by a seller, a selected plurality of advertising sources that meet a predefined condition; generating a plurality of keyword sets that correspond to the selected plurality of advertising sources; establishing a programming model according to a set of predefined constraints, wherein the programming model represents match of the selected plurality of advertising sources and the plurality of keyword sets; and determining a substantially optimal match between at least some of the plurality of advertising sources and the plurality of keyword sets by solving the programming model.

20 Claims, 4 Drawing Sheets

MATCHING OF ADVERTISING SOURCES AND KEYWORD SETS IN ONLINE COMMERCE PLATFORMS

CROSS REFERENCE TO OTHER APPLICATIONS

This application claims priority to People's Republic of China Patent Application No. 201010003928.7 entitled RETRIEVAL METHOD AND SYSTEM THEREOF FOR ONLINE TRADING PLATFORM filed Jan. 13, 2010 which is incorporated herein by reference for all purposes.

FIELD OF THE INVENTION

This invention relates to the field of website data processing and in particular to the management of Internet advertisements.

BACKGROUND OF THE INVENTION

An online commerce platform is a computer information system provided by a platform service provider to facilitate online trading. Online commerce platforms can realize online trading between sellers and buyers. On an online commerce platform, a potential buyer may retrieve an advertising source provided by a seller by inputting certain keywords. Under the bid ranking model on the Internet, the mapping between advertising sources (e.g., text files, images, etc.) provided by sellers and corresponding keywords (i.e., bought words or units) is referred to as a match between the advertising sources and the keywords. A seller may display advertisements comprising one or more advertising sources by paying for certain keywords. For example, if a seller paid for a keyword "book", then an advertising source (e.g., text file, image, etc.) specified by the seller is to be displayed to a potential buyer when a search word entered by the potential buyer is mapped to the keyword "book" under a certain rule. The seller benefits from such a match between keywords and advertising sources. Resulting activities that benefit the seller, such as click-through of the ads by the potential buyer, inquiry by the potential buyer or transaction with the potential buyer, etc., are referred to as the seller's gains.

In existing online trading platforms, an advertising source provided by the seller is retrieved based on a certain match when the potential buyer inputs a set of query keywords. The match is typically generated based on how new an advertising source is (the latest advertising source is normally of priority), and whether a match between an advertising source and the keyword may bring the maximum gain for the advertising source. For example, a seller has two advertising sources, "selling various mobile phones" and "selling imported mobile phones", to be associated with three sets of keywords "mobile phones", "Nokia mobile phones" and "Apple mobile phones". Assuming each advertising source can only be associated with at most two sets of keywords and different associations may bring for the seller the following gain levels on a scale of 1-10: 10, if "selling various mobile phones" is matched to "mobile phones"; 7, if "selling various mobile phones" is matched to "Nokia mobile phones"; 6, if "selling various mobile phones" is matched to "Apple mobile phones"; 9, if "selling imported mobile phones" is matched to "mobile phones"; 7, if "selling imported mobile phones" is matched to "Nokia mobile phones"; and 5, if "selling imported mobile phones" is matched to "Apple mobile phones". Assume that the matches between the advertising sources and the sets of keywords generated according to the existing technique are the following: the advertising source "selling various mobile phones" is matched to the keywords "mobile phones" (gain of 10) and "Nokia mobile phones" (gain of 7), and the advertising source "selling imported mobile phones" is matched to the keyword "Apple mobile phones" (gain of 5), then the match would bring the seller a total gain of 22 (i.e., 10+7+5).

However, in the foregoing example, there is also a match between the advertising sources and the keyword sets that associates "selling various mobile phones" with "mobile phones" (gain of 10) and "Apple mobile phones" (gain of 6), and associates "selling imported mobile phones" with "Nokia mobile phones" (gain of 7). This match would bring the seller a total gain of 23. It can be seen that, in practice, when advertising sources provided by the seller have a limited number of matching keyword sets, if we only consider the latest advertising sources, or if we set a match between advertising sources and keywords only based on whether the match may bring the maximum gain for the current advertising source or a group of similar advertising sources, we may obtain a match between advertising sources and keywords that does not necessarily represent every product area offered by the seller. As a result, some of the product areas by the seller may have no or few advertising sources that match a keyword set. In such a case, the potential buyer may not obtain a corresponding qualified advertising source when inputting a keyword set to perform product retrieval. And if the potential buyer repeats his search, retrieval performance of the online trading platform server will also be degraded. Further, the existing method for generating the match between advertising sources and keywords may not bring the maximum gain for the seller.

BRIEF DESCRIPTION OF THE DRAWINGS

Various embodiments of the invention are disclosed in the following detailed description and the accompanying drawings.

DETAILED DESCRIPTION

Figure 1:
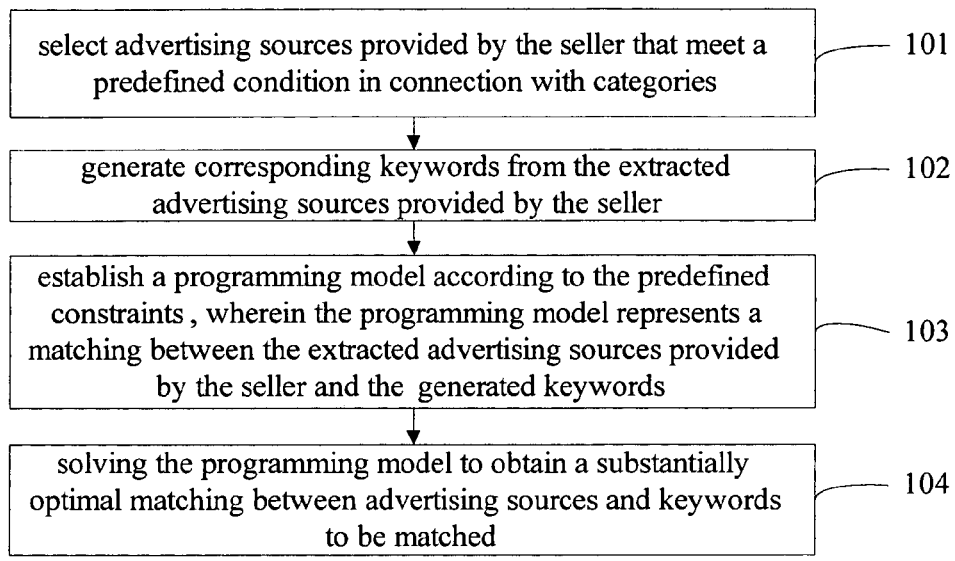
FIG. 1 is a flowchart illustrating an embodiment of a process for generating a match between advertising sources and sets of keywords.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The present application may be implemented with various general-purpose or dedicated computing device environments or configurations including personal computers, server computers, handheld devices or portable devices, flat-panel devices, multiprocessor devices, etc., as well as in distributed computing environments that include devices such as the ones described above.

The present application may be described in the general context of computer executable instructions executed by a computer, e.g. a program module. Generally, the program module may include a routine, program, object, assembly, data structure, and the like for performing a specific task or implementing a specific abstract data type. The present applicant may also be practiced in a distributed computing environment. In distributed computing environments, tasks are performed by remote processing devices connected via communication networks. In a distributed computing environment, the program module may be located in the storage medium of a local or a remote computer, including a storage device.

In embodiments described in the application, a seller provides advertising sources corresponding to certain categories. A number of advertising sources are obtained according to the distribution of advertising sources provided by the seller under respective categories. Since the advertising sources are obtained according to the distribution of advertising sources in these categories, the selected advertising sources should cover as many possible product areas offered by the seller as possible. Corresponding keyword sets are generated based on these advertising sources. A linear programming technique is used to find a substantially optimal match of the selected advertising sources and keyword sets. A programming model is established to include an objective function and a set of constraints. A solution is found for an objective function using a search-based technique. A substantially optimal match between advertising sources and corresponding keywords to be matched is obtained. The resulting match can express the maximum gain of the seller, subject to certain constraints. Subsequently, a potential buyer can retrieve the most relevant advertising source provided by the seller based on the match established above when inputting a set of keywords searching for a desired product. The purchasing experience of the potential buyer and selling experience of the seller are therefore both improved. The technique also avoids the problem of repeated searches caused by the match between advertising sources and keywords generated by other existing systems, and prevents performance degradation of the online commerce platform servers.

FIG. 1 is a flowchart illustrating an embodiment of a process for generating a match between advertising sources and sets of keywords. Process 100 may be implemented on various general-purpose or dedicated computing device environments or configurations including personal computers, server computers, handheld devices or portable devices, flat-panel devices, multiprocessor devices, etc., as well as in distributed computing environments that include devices such as the ones described above.

At 101, advertising sources provided by a particular seller that meet a predefined condition are selected. In some embodiments, the selection is made in connection with the categories of the advertising sources.

The advertising sources provided by the seller may have a variety of format, such as texts, pictures, videos, sound files, and any other appropriate formats suitable for displaying to a user. In some embodiments, advertising sources provided by the seller are categorized according to certain rules. For example, the categories of the advertising sources may be organized as a tree, where the root node is clothing and sub-nodes include men's clothing, women's clothing, and children's clothing. The sub-node "men's clothing" may further include clothing with different styles, different seasons, and the like. Approaches for categorizing the advertising sources are well known. Different techniques may be used for categorizing the advertising sources provided by the seller, as long as the same type of advertising sources that a particular requirement are under the same category. Accordingly, the advertisement sources are selected in connection with their respective categories.

The predefined condition specifies which advertising sources are to be selected. For example, a seller may configure the number of advertising sources to be matched with keywords before such a match is made. A predefined condition may require the number of the selected advertising sources to be greater than the number of advertising sources to be matched with keywords, so that every advertising source will be matched with at least a set of keywords. In some embodiments, the criteria for selecting an advertising source include when an advertising source is created, whether the advertising source has already been used previously, etc.

At 102, corresponding keyword sets are generated based on the selected advertising source provided by the seller. Well known techniques such as headword selecting and extended matching may be used to generate keywords. A criterion for generating the keyword sets requires the generated keyword sets to relate to the advertising sources on some level and represent purchase intention of the potential buyer. For example, if the advertising source provided by the seller is the text "selling various Nokia mobile phones", the generated keyword sets may include "mobile phones", "Nokia mobile phones", and "various mobile phones".

At 103, a programming model is established. The programming model includes an objective function that is subject to one or more predefined constraint. The programming model represents a match between the selected advertising sources provided by the seller and the generated keyword sets. The match is sometimes referred to as a mapping of the advertising sources provided by the seller and corresponding keyword sets.

In this embodiment, the predefined constraints include the number of advertising sources to be matched with keyword sets, the number of keyword sets to which each of the advertising sources maps, etc. Other constrains may be predefined in other embodiments. The values of the constraints are normally predefined by the seller. Since the number of the advertising sources and the number of keywords to which each of the advertising sources maps are limited, in order to establish the programming model meeting the constraint above, an integer variable having the value of 0 or 1 is introduced to represent whether a certain advertising source is mapped to a certain keyword set. In this example, an entry with the value of 1 represents mapping and an entry with the value of 0 represents no mapping. As will be described in greater detail below, an objective function for maximizing the gain of the seller is set up, subject to the predetermined constraint. As used herein, the gain of the seller represents the benefit brought to the seller by a match established between a certain advertising source and a certain keyword set. For example, a click through rate for the seller may be used to measure the gain. A detailed process for establishing the programming model will be described below.

At 104, the objective function is solved by using a search-based solution, to obtain a substantially optimal match (mapping) between advertising sources and keyword sets.

After the programming model is established in the step 103, a search-based solution may be used to solve the objective function of the programming model, and the result is a substantially optimal match between advertising sources and keywords. Details of how to solve the objective function using a search-based solution are described below. The total number of advertising sources in the match is referred to as the number of advertising sources to be matched with the keyword sets, which is pre-specified by the seller. The constraints pre-specified by the seller include the number of advertising sources to be matched with keyword sets and an upper threshold of the number of keyword sets to which each of the advertising sources matches.

In some embodiments, the match between advertising sources and keywords is sent to the seller when it is generated, and the seller is allowed to determine whether the match meets his requirement, as well as to accept, reject, and/or modify the match.

The match solved in the present application may be used repeatedly. The match between the advertising sources and the keyword sets may be used in various applications once established. Generally, when the potential buyer inputs a keyword, the online commerce platform server may retrieve an advertising source provided by a seller based on the pre-generated matching, and returns the content of the advertising source to the potential buyer. The match established in the embodiment of the present application represents product information of the seller and therefore improves the likelihood that the potential buyer will make a purchase because of the advertisement.

Figure 2:
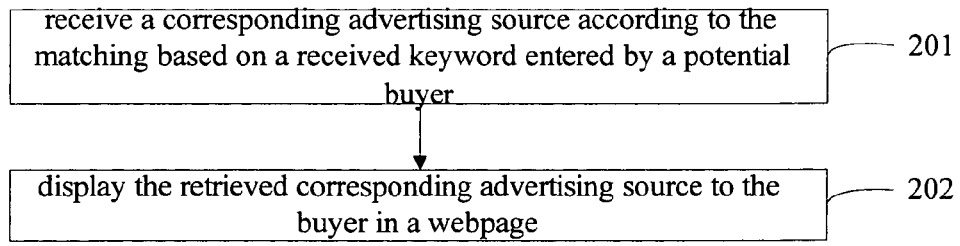
FIG. 2 is a flowchart illustrating an embodiment of a process for retrieving advertising sources from an online commerce platform that was configured according to process 100 shown in FIG. 1.

FIG. 2 is a flowchart illustrating an embodiment of a process for retrieving advertising sources from an online commerce platform that was configured according to process 100 shown in FIG. 1. That is, in this example, the match of advertising sources and keyword sets for the seller is stored at the online trading platform server end once generated.

At 201, a query keyword set is input by a potential buyer.

At 202, a corresponding advertising source is retrieved based on the match between keyword sets and advertising sources previously established according to process 100 shown in FIG. 1.

When the potential buyer inputs a keyword set, i.e., a set of keywords for a desired product or article, a corresponding advertising source is retrieved by the server based on the match resulting from process 100. The advertising source retrieved based on the stored match in the embodiment accurately reflects the actual product information of the seller and the purchase intention of the potential buyer. Thus, the technique allows the potential buyer to find his desired product more accurately, without having to repeat the retrieval or change the query keywords. Furthermore, since the advertising sources in the match established in the embodiment of the present application are selected according to categories, the online trading platform server only needs to perform the retrieval according to the category to which the advertising source belongs. Therefore, the number of times of searches performed by the online trading platform server is reduced, thereby improving retrieval performance of the online trading platform server.

At 203, the retrieved advertising source is displayed to the potential buyer. In some embodiments, the server compose the advertisement displayed to the potential buyer based on the advertising source, displays the advertisement in a webpage, so that the potential buyer may obtain information of a particular product and/or make a purchase by clicking on the advertisement.

Figure 3:
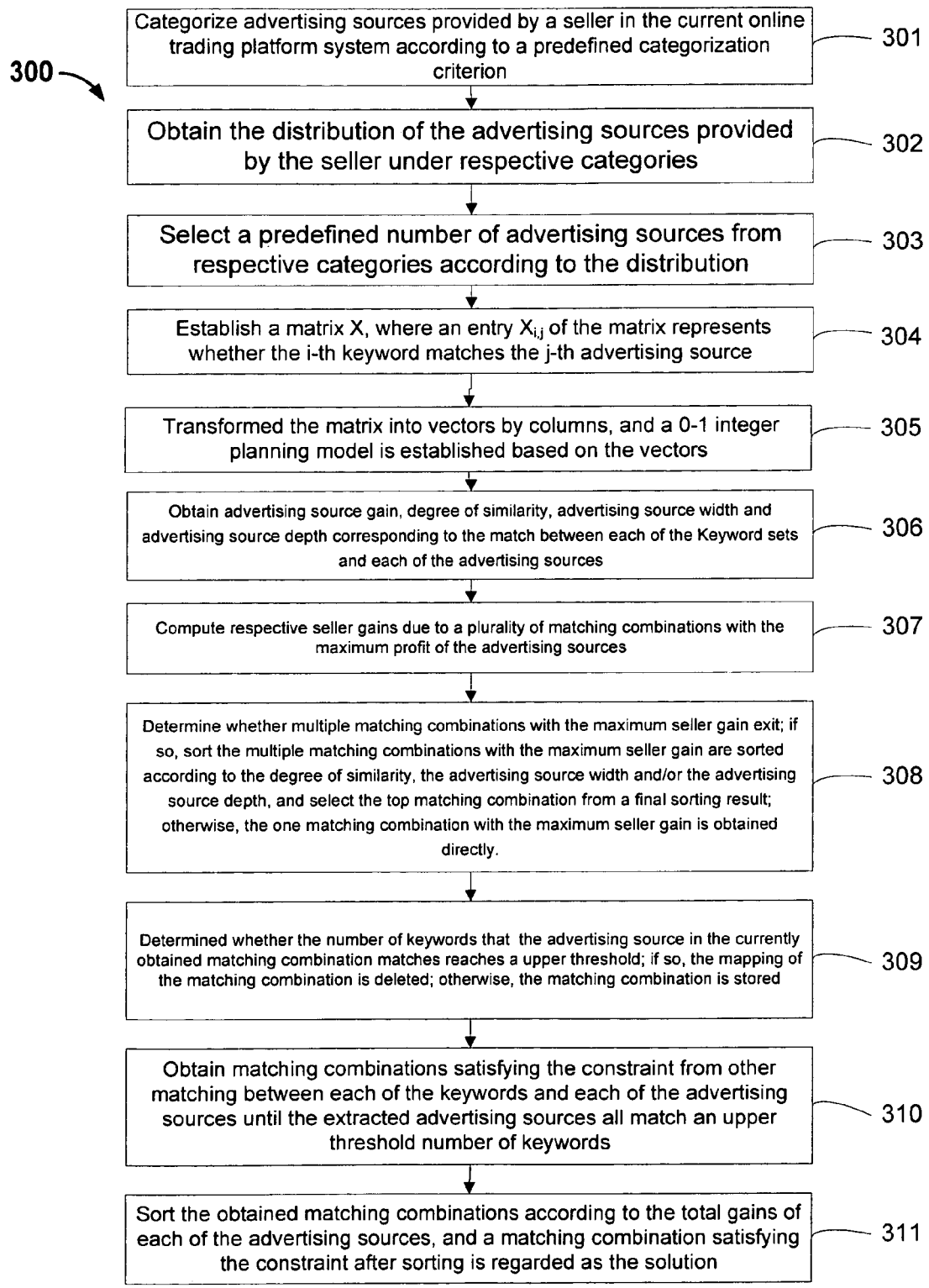
FIG. 3 is a flowchart illustrating an embodiment of a process for generating a match between advertising sources and keywords.

FIG. 3 is a flowchart illustrating an embodiment of a process for generating a match between advertising sources and keywords.

At 301: advertising sources provided by a seller in the current online trading platform system are categorized according to a predefined categorization criterion. Any appropriate categorization technique may be used. The categorized advertising sources are stored to facilitate subsequent selection of advertising sources from a certain category of advertising sources.

At 302, the distribution of the advertising sources provided by the seller under respective categories is obtained. At 303, a predefined number of advertising sources are selected from respective categories according to the distribution.

The distribution is subsequently used for selecting the advertising sources in proportion to the number of advertising sources in each category. By selecting advertising sources according to the distribution of the advertising sources under respective categories, at least some advertising source is selected from each category to be matched with queries and no category is left out. This way, pertinent advertising source provided by the seller will be presented to the potential buyer, improving the chance of user click through and/or purchase. In some online commerce platforms, positive user feedback reinforces the mapping. Thus, when potential buyers input the same keyword to search subsequently, there is a better chance that the online trading platform server will find the same match of keyword to advertising sources.

For example, if the distribution of advertising sources provided by the seller under category A and category B is 1:2, then the selected advertising sources from category A and category B also have a ratio of 1:2.

In some embodiments, the total number of selected advertising sources needs to meet a certain requirement. In this example, the number of selected advertising sources is required to be greater than the number of advertising sources used for matching the keyword sets since multiple advertising sources can correspond to one keyword set. In some embodiments, the system selects twice as many advertising sources as required for keyword matching. In general, however, a keyword normally corresponds to one advertising source or one group of advertising sources considering search speed and performance of the online trading platform server. Therefore, it is not necessary to traverse all advertising sources in subsequent searching of advertising sources based on a keyword. Each keyword may retrieve a different advertising source, thereby increasing search speed of the online trading platform server. For example, the advertising source "selling various mobile phones" is mapped to the keyword set "mobile phones", and the advertising source "selling mobile phones" is also mapped to the keyword set "mobile phones". The two advertising sources and their respective matching relationships can coexist such that they may map to the same keyword set.

After selecting the advertising sources provided by the seller for keyword matching, at 304, a programming model is established with the objective of maximizing the gain of the seller. In particular, a matrix X of n rows and m columns is to be established. The rows of the matrix correspond to keyword sets and the columns correspond to advertising sources. Thus, matrix entry $X_{i,j}$ denotes whether the i-th keyword matches the j-th advertising source, i.e., whether there is a mapping between the i-th keyword and the j-th advertising source, where i=1, ..., n, and j=1, ..., m.

At 305, the matrix is transformed into a vector, and a 0-1 integer programming model is established based on the vector after the transform.

To transform the matrix into vector, the second column of the matrix is connected to the end of the first column, the third column is connected to the end of the second column, and so on, until the last column of the matrix is connected to the end of the second last column. In this way, the matrix is transformed into a vector with n*m entries. The programming model establishes the following objective function based on the vector and the constraints:

$$\max \sum_{i=1}^{n} \sum_{j=1}^{m} P_{ij} X_{ij}$$

$$\text{Subject to} \begin{cases} \sum_{i=1}^{n} X_{i,j} \le N_j, j=1, \ldots, m \\ \sum_{j=1}^{m} X_{i,j} \le 1, i=1, \ldots, n \\ X_{ij} = 1 \text{ or } 0 \end{cases}$$

where $P_{ij}$ represents the gain if the i-th keyword matches the j-th advertising source; $X_{ij}$ represents whether the i-th keyword matches the j-th advertising source, with 1 representing matching and 0 representing not matching; $N_j$ represents the maximum number of keywords that the j-th advertising source can have; n represents the total number of keywords; and m represents the total number of selected advertising sources.

The objective function is solved by using a search-based technique to find a solution of a match between selected advertising sources and keyword sets that provides maximum seller gain, subject to the constraints.

The match between the i-th keyword and the j-th advertising source is represented by a set of values. In some embodiments, advertising source gain, degree of similarity, advertising source breadth, and advertising source depth are used to represent the match. At 306, advertising source gain, degree of similarity, advertising source breadth, and advertising source depth corresponding to each match between respective keywords and advertising sources are obtained.

In this example, advertising source gain, degree of similarity, advertising source breadth, and advertising source depth corresponding to the match between the i-th keyword and the j-th advertising source in the matrix X are obtained. The advertising source breadth represents the greatest extent that a keyword set matches the advertising sources. The advertising source depth represents the greatest extent an advertising source matches the keyword sets.

In practice, the gain, degree of similarity, advertising source breadth and advertising source depth are numerical values present in the embodiment of the present application. The degree of similarity represents the similarity between an advertising source and a keyword, and can be computed using well known techniques.

In some embodiments, the advertising source breadth and the advertising source depth are computed as follows:
the advertising source breadth=the number of keywords limited for an advertising source−the number of keywords that currently match the advertising source;
the advertising source depth=the number of keywords limited for an advertising source.

At 307, among the multiple match combinations having the maximum gain for an advertising source, the seller's gains achieved by these match combinations are computed respectively.

First, all match combinations in the vectors are sorted according to advertising source gains. Top match combinations having the maximum gain for an advertising source are determined. Seller gains due to the respective top match combinations are computed. A seller gain is computed as follows:
seller gain=maximum gain of a specific advertising source and a keyword set match−a loss for the seller caused by the match,
where the loss for the seller caused by a certain matching is defined as: the maximum gain due to the match of another advertising source to the same keyword set.

It should be noted that, the seller gain may be computed using an evaluation function, that is, the gain for the seller due to a certain match may be obtained by constructing an evaluation function. In one example, the evaluation function is defined as:
the gain for the seller due to a certain match=maximum gain from the match between the advertising source and the keyword−the loss for the seller caused by the match.

At 308, it is determined whether multiple match combinations with the maximum seller gain exist; and if so, the multiple match combinations with the maximum seller gain are sorted according to the degree of similarity, the advertising source breadth and/or the advertising source depth, and the top match combination is selected from the final sorting result; otherwise, the one match combination with the maximum seller gain is obtained directly.

In this step, if there is only one match combination with the maximum seller gain, the one match combination with the maximum seller gain is obtained and the next step is performed; if there are multiple match combinations with the maximum seller gain, the multiple match combinations with the maximum seller gain are sorted according to the degree of similarity, and match combinations with the maximum degree of similarity are obtained according to the sorting result. Further, if there is only one match combination with the maximum degree of similarity, the one match combination with the maximum seller gain is obtained; and if there are multiple match combinations with the maximum degree of similarity, the multiple match combinations with the maximum degree of similarity are sorted according to the advertising source breadth, and the top match combination is obtained as the result of the step. In this step, the optimal match combination relationship is obtained in the order of the gain, degree of similarity, advertising source breadth and/or advertising source depth.

At 309, it is determined whether the number of keywords that the advertising source in the currently obtained match combination matches reaches the upper threshold; and if so, the mapping of the match combination is deleted; otherwise, the match combination is stored.

In this example, since there is a predefined constraint on the number of keywords that each advertising source is allowed to match, in this step the match obtained in the preceding step is verified against this constraint. In other words, it is checked whether the number of keywords that the advertising source in the match matches reaches the threshold; and if so, the mapping of the match combination is deleted and the next step is performed; otherwise, the mapping between the advertising source and the keyword indicated by the match is stored, the mapping relationship of the match should also be deleted because it is required that the match cannot be retrieved again in subsequent traversing, and the next step is performed.

At 310, match combinations meeting the constraint continue to be obtained from other match between keyword sets and advertising sources, until the selected advertising sources all match an upper threshold number of keywords.

After obtaining the match between an advertising source and a keyword set, other matches between another keyword and another advertising source are found by traversing the matrix. And the approach for obtaining the match through traversing may be the same as the steps 306~309, until the advertising sources selected in the step 302 all match an upper threshold number of keywords.

At 311, the obtained match combinations are sorted according to the total gain for each advertising source, and a match combination meeting the constraint after sorting is regarded as the solution.

The total gains for the selected advertising sources are then computed. For example, if an advertising source matches two keywords, the total gain equals to the sum of gains where the advertising source matches to each of the two keywords, respectively. The resulting match combinations are then sorted according to the total gains, and a certain number of match combinations are selected from the sorting result as the solution. The number of match combinations equals to the number of advertising sources used for matching.

Steps 201 and 202 of process 200 may also be included following step 311 to retrieve advertising sources provided by the seller based on the match generated in process 200 based on a set of keywords entered by the potential buyer. By using this retrieval method, displayed advertising sources can better cover the product areas offered by the seller, while being closer to the purchase intention of the potential buyer. Thus, it is not necessary for the potential buyer in the trading on the online trading platform to input a keyword repeatedly for retrieval. This may reduce the number of times of retrievals of the online trading platform server and improve retrieval speed and performance.

A detailed example is illustrated in connection with process 300 for purposes of explanation. It is assumed that the advertising sources provided by a given seller have already been categorized, and the distribution of the sources has been obtained according to steps 301 and 302 of the process.

At 303, for this seller, advertising sources provided by the seller that meet a predefined condition are obtained in connection with categories.

In the example, the predefined condition requires at least 3 matching advertising sources each having at least 2 keywords. In this example, there are 100 advertising sources provided by a seller A and the selected advertising sources are labeled as 1, 2, 3, 4, 5, and 6.

Next, corresponding keyword sets are generated from the obtained advertising sources. In this example, keyword sets generated by advertising source 1 are a, b, and c; keyword sets generated by advertising source 2 are c, d, and e; keyword sets generated by an advertising source 3: d and e; keyword sets generated by advertising source 4 are a and d; keyword sets generated by advertising source 5 are a, d, and e; and keyword sets generated by advertising source 6 are a, b, and d.

At 304, a matrix X is established. In this example, the rows of the matrix correspond to the keywords, and the columns of the matrix correspond to the advertising sources. An entry $X_{i,j}$ in the matrix indicates whether the i-th keyword matches the j-th advertising source.

At 305, the matrix is transformed into a vector, and the following programming model is established according to the vector:

$$\max \sum_{i=1}^{n} \sum_{j=1}^{m} P_{ij} X_{ij}$$

$$S, t = \begin{cases} \sum_{i=1}^{n} X_{i,j} \leq N_j, j = 1, \ldots, m \\ \sum_{j=1}^{m} X_{i,j} \leq 1, i = 1, \ldots, n \\ X_{ij} = 1 \text{ or } 0 \end{cases}$$

The programming model is established according to the vector after the transformation. In some embodiments, a substantially optimal result for the objective function of the programming model is computed by using a search-based solution with reference to the specific situation of the match between each keyword and each advertising source. The computing process of the search-based solution is illustrated hereinafter.

At 306, advertising source gain, degree of similarity, advertising source breadth, and advertising source depth corresponding to the match between each keyword and each advertising source are obtained respectively.

In this example, the gain, degree of similarity, advertising source breadth and advertising source depth of the match between each of the 6 advertising sources and each of the 5 keywords are shown in Table 1, where the sequential four numbers in each entry box represent the gain, degree of similarity, advertising source breadth, and advertising source depth of a corresponding match, respectively:

TABLE 1

|  | Advertising source 1 | Advertising source 2 | Advertising source 3 | Advertising source 4 | Advertising source 5 | Advertising source 6 |
|---|---|---|---|---|---|---|
| Keyword a | 5, 3, 2, 1 | 0, 0, 0, 0 | 0, 0, 0, 0 | 3, 3, 5, 1 | 5, 2, 1, 4 | 5, 2, 1, 3 |
| Keyword b | 4, 3, 3, 1 | 0, 0, 0, 0 | 0, 0, 0, 0 | 0, 0, 0, 0 | 0, 0, 0, 0 | 3, 2, 5, 2 |
| Keyword c | 5, 3, 2, 4 | 4, 2, 5, 1 | 0, 0, 0, 0 | 0, 0, 0, 0 | 0, 0, 0, 0 | 0, 0, 0, 0 |
| Keyword d | 0, 0, 0, 0 | 5, 3, 5, 3 | 4, 3, 2, 1 | 4, 2, 1, 3 | 4, 3, 2, 3 | 4, 2, 1, 3 |
| Keyword e | 0, 0, 0, 0 | 5, 3, 3, 1 | 4, 3, 2, 1 | 0, 0, 0, 0 | 4, 2, 2, 1 | 0, 0, 0, 0 |

At 307, among multiple match combinations with the maximum advertising source gain, multiple seller gains for the seller due to the multiple match combinations are computed respectively.

The match combinations are sorted according to the advertising source gains. The resulting match combinations with the maximum advertising source gain of 5 include: keyword a matching advertising source 1: 5, 3, 2, 1; keyword a matching advertising source 5: 5, 2, 1, 4; keyword a matching advertising source 6: 5, 2, 1, 3; keyword c matching advertising source 1: 5, 3, 2, 4; keyword d matching advertising source 2: 5, 3, 5, 3; and keyword e matching advertising source 2: 5, 3, 3, 1.

The seller gains for the seller brought by the match combination with respect to each keyword are computed. A seller gain is computed by subtracting the loss for the seller caused by the match from the maximum gain of the match between the advertising source and the keyword. Thus, in this step, the seller gain for the seller due to each matching is computed as follows:

keyword a matching advertising source 1: 5−5=0
keyword a matching advertising source 5: 5−5=0
keyword a matching advertising source 6: 5−5=0
keyword c matching advertising source 1: 5−4=1
keyword d matching advertising source 2: 5−4=1
keyword e matching advertising source 2: 5−4=1

At 308, the multiple match combinations with the maximum seller gain are sorted again according to the degree of similarity, advertising source breadth, and/or advertising source depth sequentially and the top match combination is selected from the final sorting result.

The match combinations with the maximum seller gain are selected in the order of the seller gain in the preceding step. The three matching relationships that provide the most seller gain are: c:1, d:2, e:2. Then, sorting is performed further according to the other three values, and we have: keyword d matching advertising source 2: 1, 3, 5, 3; keyword e matching advertising source 2: 1, 3, 3, 1; and keyword c matching advertising source 1: 1, 3, 2, 4.

At 309, it is determined whether the number of keywords that the advertising source in the currently obtained matching matches reaches the upper threshold; and if so, the mapping of the match combination is deleted; otherwise, the match combination is stored.

The first match is selected as the match between the advertising source 2 and the keyword set d since the matches have the same seller gain and degree of similarity, but the 2-d match has the highest breadth value compared to the rest. It is further determined whether the number of keywords that the advertising source 2 matches has reached the limit (in this case, 2). If it does not reach the limit, the match is stored; and if it reaches the limit, the match between advertising source 2 and keyword set d is deleted (i.e., all corresponding values for the keyword d and the advertising source 2 are set as 0) so that the same match is not found again when the process is repeated subsequently.

At 310, the resulting match combinations are sorted according to the total gain of each advertising source, and the match combinations that meet the constraint after the sorting is regarded as the solution.

At 311, all resulting match combinations for the 6 advertising sources are sorted according to the total gains of the 6 advertising sources, i.e., the sum of gains for the respective 2 keywords corresponding to the 6 advertising sources. Then, the top 3 advertising sources after sorting are regarded as the solution. The solution may further be returned to the seller as the match between advertising sources and keywords.

In practice, considering algorithm performance, a greedy algorithm may be used to select in match combinations with the maximum seller gain. Different algorithms and implementation processes may vary depending on practical situations. The retrieval of the advertising sources in the present application is made based on the particular matching generated by the present application, therefore the retrieved advertising sources may allow the potential buyer to retrieve more accurate advertising sources with fewer queries, thus reducing the number of times of retrievals by the online trading platform and improving retrieval performance of the online trading platform.

For the purpose of simplicity in description, the foregoing method embodiments are illustrated as a series of action combinations. However, it is to be appreciated by those skilled in the art that the present application is not limited to the sequence of the described actions since some of the steps may be performed in another order or concurrently according to the present application. In addition, it is also to be appreciated that the embodiments illustrated herein are preferable embodiments, and their related actions and modules are not mandatory for implementing the application.

Figure 4:
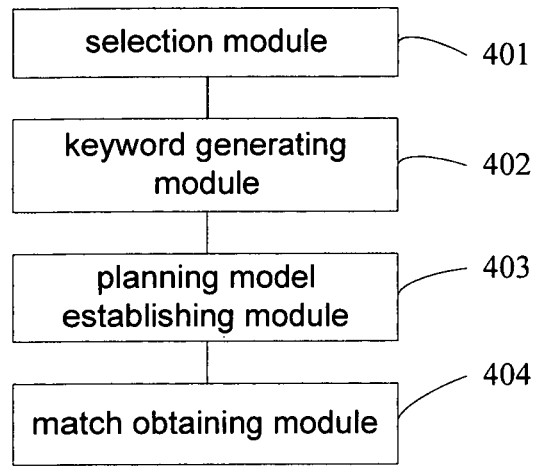
FIG. 4 is a block diagram illustrating an embodiment of a device for generating a match between advertising sources and keywords.

FIG. 4 is a block diagram illustrating an embodiment of a device for generating a match between advertising sources and keywords. In this example, the device includes: a selection module 401, adapted to select advertising sources provided by a seller that meet a predefined condition in connection with categories; a keyword generating module 402, adapted to generate corresponding keywords from the selected advertising sources provided by the seller; a programming model establishing module 403, adapted to establish a programming model that includes an objective function according to the predefined constraint, wherein the programming model represents a match between the selected advertising sources provided by the seller and the generated keywords; and a matching obtaining module 404, adapted to solve the objective function by using a search-based solution, to obtain a match between advertising sources and keywords to be matched.

Figure 5:
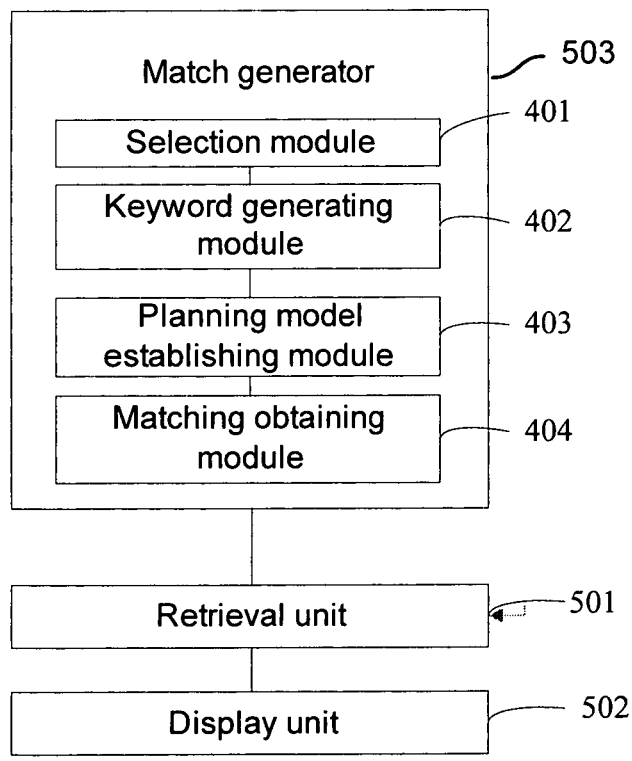
FIG. 5 is a block diagram illustrating an embodiment of a retrieval system in the online trading platform.

FIG. 5 is a block diagram illustrating an embodiment of a retrieval system in the online trading platform. The system includes a match generator 503 adapted to: select advertising sources provided by a seller that meet a predefined condition in connection with categories; generate corresponding keywords from the selected advertising sources provided by the seller; establish a programming model that includes an objective function according to the predefined constraint, wherein the programming model represents a match between the selected advertising sources provided by the seller and the generated keywords; and solve the objective function by using a search-based solution to obtain a match between advertising sources and keywords to be matched. The system further includes a retrieval unit 501, adapted to retrieve a corresponding advertising source according to the match based on a received keyword entered by a potential buyer, and a display unit 502, adapted to display the retrieved corresponding advertising source to the potential buyer in a website page. The display unit may display audio, video, or any other appropriate information that may be perceived by the potential buyer.

The device provided by the embodiment may be integrated into a search engine server or separately connected with the search engine server. If the method of the present application is implemented in software, it may be implemented as a function newly added to the search engine server, or as a separate component. The present application is not limited to the described implementations of the method and the device.

Figure 6:
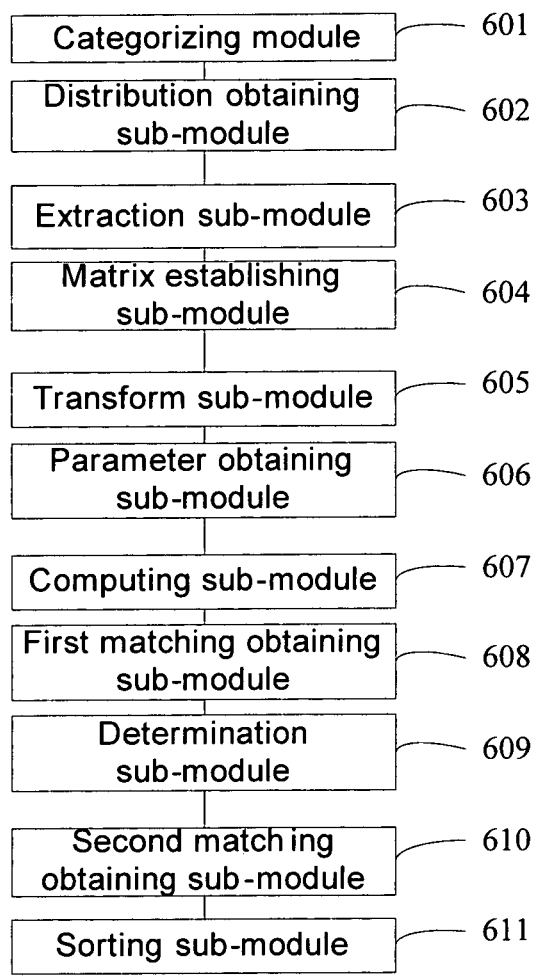
FIG. 6 is a block diagram illustrating another embodiment of a system for generating a match between advertising sources and keywords.

FIG. 6 is a block diagram illustrating another embodiment of a system for generating a match between advertising sources and keywords. In this example, the device includes: a categorizing module 601, adapted to categorize all advertising sources provided by a seller in the current online trading platform system according to a predefined categorization criterion; a distribution obtaining sub-module 602, adapted to obtain the distribution of all the advertising sources provided by the seller under respective categories; a selection sub-module 603, adapted to select a predefined number of advertising sources under each category according to the distribution, where the predefine number is greater than the number of advertising sources to be matched with; a matrix establishing sub-module 604, adapted to establish a matrix X, where a term $X_{i,j}$ of the matrix represents whether the i-th keyword matches the j-th advertising source; a transform sub-module 605, adapted to transform the matrix into a vector by columns and establish a programming model with the following objective function according to the vector:

$$\max \sum_{i=1}^{n} \sum_{j=1}^{m} P_{ij} X_{ij}$$

$$\text{Subject to} \begin{cases} \sum_{i=1}^{n} X_{i,j} \leq N_j, \, j = 1, \ldots, m \\ \sum_{j=1}^{m} X_{i,j} \leq 1, \, i = 1, \ldots, n \\ X_{ij} = 1 \text{ or } 0 \end{cases}$$

The system further includes a parameter obtaining sub-module 606, adapted to obtain an advertising source gain, a degree of similarity, an advertising source breadth and an advertising source depth corresponding to a match between each keyword and each advertising source, respectively.

The system further includes a computing sub-module 607, adapted to compute multiple seller gains due to multiple match combinations for the seller among the multiple match combinations with the maximum advertising source gain; a first match obtaining sub-module 608, adapted to determine whether multiple match combinations with the maximum seller gain exist; and if so, to sort the multiple match combinations with the maximum seller gain according to the degree of similarity, the advertising source breadth and/or the advertising source depth, and to select the top match combination among the final sorting result; otherwise, to obtain the one match combination with the maximum seller gain directly.

The system further includes a determination sub-module 609, adapted to determine whether the number of keywords that the advertising source in the currently obtained match combination matches reaches an upper threshold; if so, to delete the mapping of the match combination; otherwise, to store the match combination.

The system further includes a second matching obtaining sub-module 610, adapted to obtain continuously match combinations meeting the constraint from other matching between each of the keywords and each of the advertising sources until the selected advertising sources all match an upper threshold number of keywords.

The system further includes a sequencing sub-module 611, adapted to sort the obtained match combinations according to the total gains of each of the advertising sources, and take a match combination meeting the constraint after sorting as a solution.

The modules and/or units described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules and/or units may be implemented on a single device or distributed across multiple devices. The functions of the modules and units may be merged into one another or further split into multiple sub-modules and/or sub-units.

Finally, it is to be noted that, relational terms such as first and second are merely used herein to distinguish one entity or operation from another, which do not claim or suggest an actual relationship or sequence between these entities or operations. Further, terms "including", "containing" or their varieties are intended as a non-exclusive coverage, thus, a process, method, article or device including a series of elements not only includes these factors, but also includes other elements that are not listed explicitly, or include elements that are inherent to the process, method, article or device. In the case that no further limitation is given, the element defined by the word "including a" do not exclude additional identical elements present in the process, method, article or device including the element.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. An online advertisement method, comprising:
   selecting, among a plurality of advertising sources provided by a seller, a selected plurality of advertising sources that meet a predefined condition;
   generating, using a processor, a plurality of keyword sets that correspond to the selected plurality of advertising sources;

establishing, using the processor, a programming model according to a set of predefined constraints, wherein the programming model represents matches of the selected plurality of advertising sources and the plurality of keyword sets; and determining, using the processor, a substantially optimal match between at least some of the plurality of advertising sources and the plurality of keyword sets by finding a solution for the programming model, wherein establishing the programming model according to the set of predefined constraints comprises:

establishing a matrix X, an entry $X_{i,j}$ of the matrix representing whether the i-th keyword matches the j-th advertising source; and establishing an objective function subject to the set of predefined constraints as:

$$\max \sum_{i=1}^{n}\sum_{j=1}^{m} P_{ij} X_{ij}$$

$$\text{Subject to} \begin{cases} \sum_{i=1}^{n} X_{i,j} \le N_j, j=1,\ldots,m \\ \sum_{j=1}^{m} X_{i,j} \le 1, i=1,\ldots,n \\ X_{ij} = 1 \text{ or } 0 \end{cases}$$

where $P_{ij}$ represents a seller gain due to a match between the i-th keyword and the j-th advertising source; $X_{ij}$ represents whether the i-th keyword matches the j-th advertising source; $N_j$ represents a maximum number of keywords that the j-th advertising source is allowed to have n represents total number of the keywords, and m represents total number of the selected advertising sources.

2. The method according to claim 1, further comprising:
receiving a keyword set entered by a potential buyer; and
retrieving a corresponding advertising source according to the substantially optimal match based on the received keyword set.

3. The method according to claim 1, further comprising displaying to the potential buyer the retrieved corresponding advertising source in a webpage.

4. The method according to claim 1, further comprises categorizing the plurality of advertising sources provided by the seller according to a predefined categorization criterion.

5. The method according to claim 4, wherein selection of the selected plurality of advertising sources that meet the predefined condition is made in connection with categorized set of advertising sources.

6. The method according to claim 5, wherein selecting the advertising sources provided by the seller that meet the predefined condition in connection with categories comprises:

obtaining a distribution of the plurality of advertising sources provided by the seller according to categories; and selecting a predefined number of advertising sources from respective categories according to the distribution, wherein the predefined number is greater than a seller specified constraint on the number of advertising sources to be matched with keyword sets.

7. The method according to claim 1, wherein the set of predefined constraints comprises number of the advertising sources to be matched with keyword sets.

8. The method according to claim 1, wherein the set of predefined constraints comprises a maximum number of keyword sets for each of the advertising sources.

9. The method according to claim 1, wherein the objective function is solved by using a search-based solution.

10. The method according to claim 1, further comprising solving the objective function, including:

obtaining match combinations meeting the set of predefined constraints, including:
obtaining an advertising source gain, an degree of similarity, an advertising source breadth and an advertising source depth corresponding to a match between each of the keywords and each of the selected advertising sources, respectively;

computing, among a plurality of match combinations with the maximum advertising source gain, a plurality of seller gains from the plurality of match combinations for the seller;

determining one or more match combinations with maximum seller gain;

determining whether the number of keywords that the advertising source in a current match combination matches reaches the maximum number;

in the event that the number of keywords that the advertising source in a current match combination matches reaches the maximum number, deleting the mapping of the match combination; otherwise, storing the match combination;

repeat obtaining match combinations meeting the set of predefined constraints from other matching between each of the keywords and each of the advertising sources, until the selected advertising sources all match the maximum number of keywords; and sorting the obtained match combinations according to total gains of each of the advertising sources; and selecting a match combination from the obtained match combinations that meets the set of predefined constraints as a solution to the objective function.

11. An online advertisement system, comprising:
one or more processors configured to:
select, among a plurality of advertising sources provided by a seller, a selected plurality of advertising sources that meet a predefined condition;

generate a plurality of keyword sets that correspond to the selected plurality of advertising sources;

establish a programming model according to a set of predefined constraints, wherein the programming model represents matches of the selected plurality of advertising sources and the plurality of keyword sets; and determine a substantially optimal match between at least some of the plurality of advertising sources and the plurality of keyword sets by finding a solution for the programming model, wherein establishing the programming model according to the set of predefined constraints comprises:

establishing a matrix X, an entry $X_{i,j}$ of the matrix representing whether the i-th keyword matches the j-th advertising source; and establishing an objective function subject to the set of predefined constraints as:

$$\max \sum_{i=1}^{n}\sum_{j=1}^{m} P_{ij} X_{ij}$$

$$\text{Subject to} \begin{cases} \sum_{i=1}^{n} X_{i,j} \leq N_j, j = 1, \ldots, m \\ \sum_{j=1}^{m} X_{i,j} \leq 1, i = 1, \ldots, n \\ X_{ij} = 1 \text{ or } 0 \end{cases}$$

where $P_{ij}$ represents a seller gain due to a match between the i-th keyword and the j-th advertising source; $X_{ij}$ represents whether the i-th keyword matches the j-th advertising source; $N_j$ represents a maximum number of keywords that the j-th advertising source is allowed to have n represents total number of the keywords, and m represents total number of the selected advertising sources; and one or more memories coupled to the one or more processors, configured to provide the processors with instructions.

12. The system according to claim 11, the processors being further configured to:
receive a keyword set entered by a potential buyer; and
retrieve a corresponding advertising source according to the substantially optimal match based on the received keyword set.

13. The system according to claim 11, the processors being further configured to display to the potential buyer the retrieved corresponding advertising source in a webpage.

14. The system according to claim 11, the processors being further configured to categorize the plurality of advertising sources provided by the seller according to a predefined categorization criterion.

15. The system according to claim 14, wherein selection of the selected plurality of advertising sources that meet the predefined condition is made in connection with categorized set of advertising sources.

16. The system according to claim 15, wherein selecting the advertising sources provided by the seller that meet the predefined condition in connection with categories comprises:
obtaining a distribution of the plurality of advertising sources provided by the seller according to categories; and
selecting a predefined number of advertising sources from respective categories according to the distribution, wherein the predefined number is greater than a seller specified constraint on the number of advertising sources to be matched with keyword sets.

17. The system according to claim 11, wherein the constraint comprises number of the advertising sources to be matched with keyword sets.

18. The system according to claim 11, wherein the constraint comprises a maximum number of keyword sets for each of the advertising sources.

19. The system according to claim 11, wherein the objective function is solved by using a search-based solution.

20. The system according to claim 11, wherein the one or more processors configured to solve the objective function, including to:
obtain match combinations meeting the set of predefined constraints, including to:
obtain an advertising source gain, an degree of similarity, an advertising source breadth and an advertising source depth corresponding to a match between each of the keywords and each of the selected advertising sources, respectively;
compute, among a plurality of match combinations with the maximum advertising source gain, a plurality of seller gains from the plurality of match combinations for the seller;
determine one or more match combinations with maximum seller gain;
determine whether the number of keywords that the advertising source in a current match combination matches reaches the maximum number;
in the event that the number of keywords that the advertising source in a current match combination matches reaches the maximum number, delete the mapping of the match combination; otherwise, storing the match combination;
repeat obtaining match combinations meeting the set of predefined constraints from other matching between each of the keywords and each of the advertising sources, until the selected advertising sources all match the maximum number of keywords;
sort the obtained match combinations according to total gains of each of the advertising sources; and
select a match combination from the obtained match combinations that meets the set of predefined constraints as a solution to the objective function.

\* \* \* \* \*

UNITED STATES PATENT AND TRADEMARK OFFICE
CERTIFICATE OF CORRECTION

PATENT NO. : 8,660,901 B2
APPLICATION NO. : 12/930649
DATED : February 25, 2014
INVENTOR(S) : Zhang et al.

Page 1 of 1

It is certified that error appears in the above-identified patent and that said Letters Patent is hereby corrected as shown below:

Claims

In column 15, line 36, claim 1, after "have", insert --";"--

In column 17, line 15, claim 11, after "have", insert --";"--

Signed and Sealed this
Twenty-eighth Day of June, 2016

Michelle K. Lee
*Director of the United States Patent and Trademark Office*